(12) United States Patent
Bormann et al.

(10) Patent No.: US 11,284,564 B2
(45) Date of Patent: Mar. 29, 2022

(54) COMBINE HARVESTER WITH DRIVER ASSISTANCE SYSTEM AND METHOD FOR OPERATING A COMBINE HARVESTER WITH A DRIVER ASSISTANCE SYSTEM

(71) Applicant: CLAAS Sebstfahrende Erntemaschinen GmbH, Harsewinkel (DE)

(72) Inventors: Bastian Bormann, Guetersloh (DE); Henner Voecking, Rietberg (DE); Andreas Wilken, Bissendorf (DE); Joachim Baumgarten, Beelen (DE); Christoph Bussmann, Harsewinkel (DE); Stefan Teroerde, Warendorf (DE); Arthur Berger, Bissendorf (DE); Sascha Dieckmeyer, Melle (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 405 days.

(21) Appl. No.: 16/392,738

(22) Filed: Apr. 24, 2019

(65) Prior Publication Data
US 2019/0343043 A1 Nov. 14, 2019

(30) Foreign Application Priority Data
May 8, 2018 (DE) ..................... 10 2018 111 077.4

(51) Int. Cl.
*A01D 41/127* (2006.01)
*G05B 13/02* (2006.01)

(52) U.S. Cl.
CPC ........ *A01D 41/1274* (2013.01); *G05B 13/021* (2013.01); *G05B 2219/45017* (2013.01); *G05B 2219/45106* (2013.01)

(58) Field of Classification Search
CPC .............. A01D 41/1274; G05B 13/021; G05B 2219/45017; G05B 2219/45106
See application file for complete search history.

(56) References Cited

U.S. PATENT DOCUMENTS 6,119,442 A * 9/2000 Hale ................... A01D 41/1277
56/10.2 H
6,863,604 B2 3/2005 Behnke
(Continued)

FOREIGN PATENT DOCUMENTS

DE 10147733 A1 4/2003
DE 102013106133 A1 6/2014
(Continued)

OTHER PUBLICATIONS

European Search Report dated Sep. 5, 2019 in European Application No. EP 19 16 1490 with English translation of the relevant parts.
(Continued)

*Primary Examiner* — Ramsey Refai
(74) *Attorney, Agent, or Firm* — Collard & Roe, P.C.

(57) ABSTRACT

A combine harvester has multiple working mechanisms for carrying out specific treatment subprocesses of an overall treatment process for processing crop and a driver assistance system for controlling the working mechanisms, which includes a memory for storing data, a computing device for processing the data stored in the memory, and a graphical user interface. The driver assistance system, together with the particular working mechanisms provided for carrying out the treatment subprocesses, forms independently operating automated adjusting mechanisms which are utilized for optimizing the control of the working mechanisms for carrying out the treatment subprocesses. A process supervisor is assigned to the driver assistance system for controlling individual automated adjusting mechanisms and a data (Continued)

exchange of the automated adjusting mechanisms with one another. The process supervisor is configured for interacting with an operator to edit at least one parameter of at least one control process, which has been stored in the memory for actuation by the process supervisor.

22 Claims, 4 Drawing Sheets

(56) References Cited

U.S. PATENT DOCUMENTS

| | | | |
|---|---|---|---|
| 7,630,809 B2 | 12/2009 | Behnke et al. | |
| 7,670,218 B2 | 3/2010 | Behnke et al. | |
| 7,713,115 B2 | 5/2010 | Behnke et al. | |
| 8,676,453 B2 | 3/2014 | Behnke et al. | |
| 8,935,060 B2 | 1/2015 | Baumgarten et al. | |
| 9,125,344 B2* | 9/2015 | Baumgarten | G06Q 10/04 |
| 9,554,509 B2 | 1/2017 | Bischoff | |
| 9,675,008 B1 | 6/2017 | Rusciolelli et al. | |
| 9,756,786 B2 | 9/2017 | Heitmann et al. | |
| 9,807,926 B2 | 11/2017 | Wilken et al. | |
| 9,807,938 B2 | 11/2017 | Wilken et al. | |
| 9,877,427 B2* | 1/2018 | Missotten | B60K 35/00 |
| 10,085,372 B2 | 10/2018 | Noyer et al. | |
| 10,126,929 B2* | 11/2018 | Baumgarten | G06F 3/04847 |
| 10,318,138 B2 | 6/2019 | Scholer et al. | |
| 2003/0014171 A1 | 1/2003 | Ma et al. | |
| 2010/0217474 A1* | 8/2010 | Baumgarten | A01D 41/127 701/31.4 |
| 2012/0004812 A1 | 1/2012 | Baumgarten et al. | |
| 2014/0019018 A1* | 1/2014 | Baumgarten | A01D 41/127 701/50 |
| 2014/0171161 A1* | 6/2014 | Bischoff | A01D 41/127 460/1 |
| 2015/0046043 A1* | 2/2015 | Bollin | A01D 41/127 701/50 |
| 2016/0088794 A1* | 3/2016 | Baumgarten | A01F 12/40 460/1 |
| 2017/0188515 A1 | 7/2017 | Baumgarten et al. | |
| 2017/0325394 A1 | 11/2017 | Clement et al. | |
| 2019/0021226 A1 | 1/2019 | Dima et al. | |

FOREIGN PATENT DOCUMENTS

| | | |
|---|---|---|
| DE | 102016118203 A1 | 11/2017 |
| EP | 1543712 A1 | 6/2005 |
| EP | 1731017 A1 | 12/2006 |
| EP | 2401904 A2 | 1/2012 |
| EP | 2687923 A2 | 1/2014 |
| EP | 3132711 A1 | 2/2017 |
| EP | 3180974 A1 | 6/2017 |

OTHER PUBLICATIONS

European Search Report dated Sep. 11, 2019 in European Application No. EP 19 15 5633 with English translation of the relevant parts.

* cited by examiner

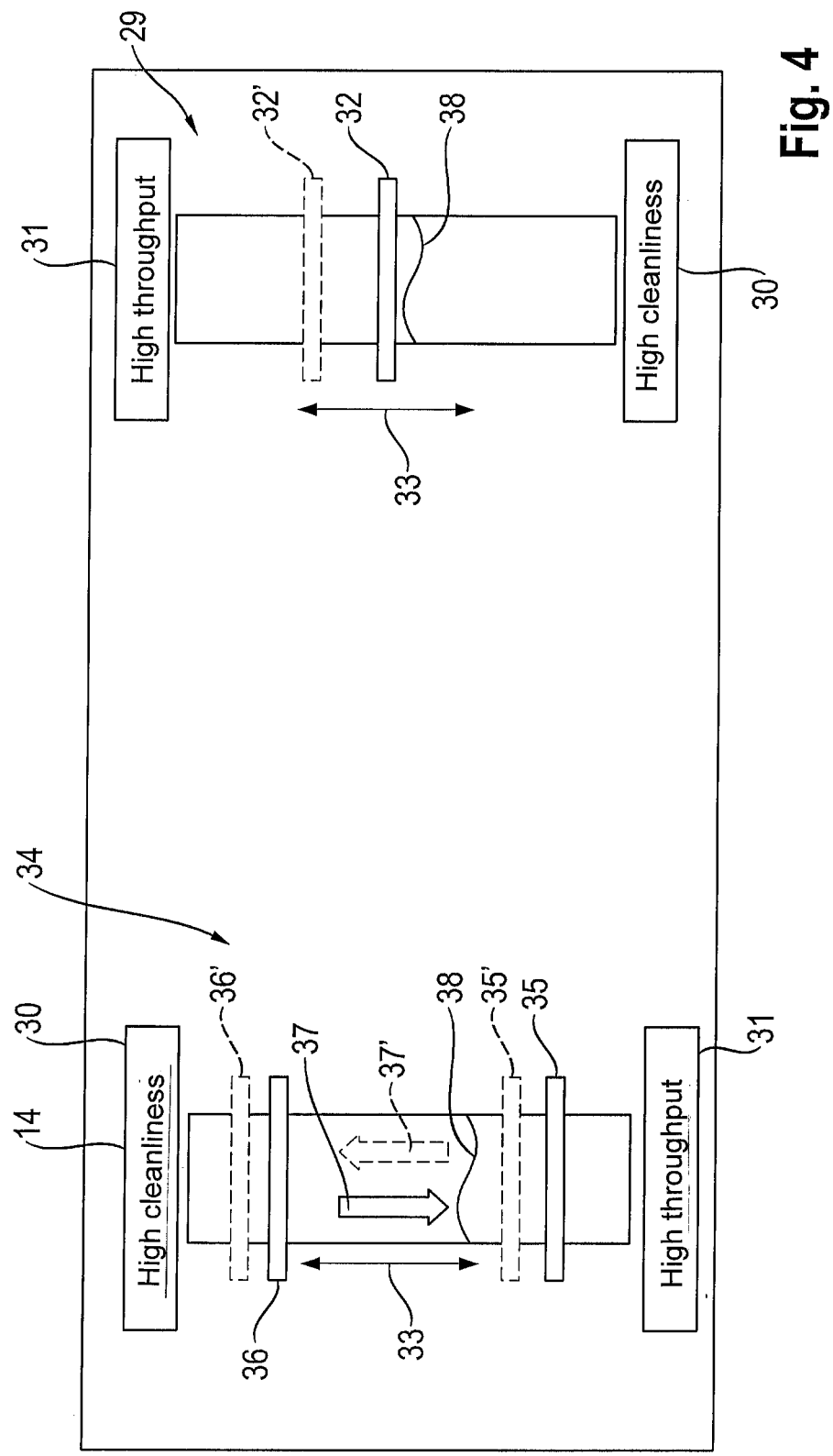

COMBINE HARVESTER WITH DRIVER ASSISTANCE SYSTEM AND METHOD FOR OPERATING A COMBINE HARVESTER WITH A DRIVER ASSISTANCE SYSTEM

CROSS-REFERENCE TO RELATED APPLICATIONS

This application claims priority under 35 USC 119 of German Application No. 102018111077.4, filed on May 8, 2018, the disclosure of which is herein incorporated by reference.

BACKGROUND OF THE INVENTION

The present invention relates to a combine harvester and to a method for operating a combine harvester.

Combine harvesters are used for mowing and threshing grain as crop. For this purpose, the combine harvester comprises multiple working mechanisms for carrying out specific treatment subprocesses of an overall treatment process for processing crop. The threshing is carried out by a threshing mechanism which obtains kernels from the crop picked up by the combine harvester with the aid of a front attachment, in particular, a header. After threshing, separation by a separating device, and subsequent cleaning by a cleaning mechanism, the kernels are fed to a grain tank. Further components of the crop, for example, the chaff and the straw, remain and are either spread onto the field together with the straw which has been chopped up by a chopper or can be set down as swath, in the case of the straw, for example, to be subsequently picked up by a baler. The need to adjust the various working mechanisms places high demands on an operator, since changes in one adjustment parameter affect other adjustment parameters or process quality parameters within a working mechanism itself. Thus, for example, increasing the rotational speed of a threshing cylinder of the threshing mechanism results in an increase of the throughput of crop, but the portion of damaged grain simultaneously increases as well.

A combine harvester is described in German Application No. DE 10 2013 106 133 A1 and comprises a driver assistance system for controlling the working mechanisms, which includes a memory for storing data, a computing device for processing the data stored in the memory, and a graphical user interface. An automated adjusting mechanism is provided for controlling a separating mechanism and an automated adjusting mechanism is provided for controlling a cleaning device. These automated adjusting mechanisms function independently of one another in order to operate the particular working mechanism at an optimal operating point. The automated adjusting mechanisms are automatically activated by the driver assistance system, although they can be optionally activated or deactivated by an operator. While the working mechanisms "separating mechanism" and "cleaning mechanism" are controlled by the automated adjusting mechanisms in order to achieve an optimal operation under given operating conditions, it is the responsibility of the operator to adjust the remaining working mechanisms. To this end, the operator must be able to respond appropriately and promptly to changes induced by one or both automated adjusting mechanisms. An effective overall control of the machine cannot be implemented in this way.

SUMMARY OF THE INVENTION

Proceeding from the related art, the problem addressed by the invention is that of refining and improving a combine harvester comprising a driver assistance system in such a way that an overall control of the machine is made possible while also placing a particularly low demand on the operator.

This problem is solved by a combine harvester which comprises multiple working mechanisms for carrying out specific treatment subprocesses of an overall treatment process for processing crop, as well as a driver assistance system for controlling the working mechanisms, which includes a memory for storing data and a computing device for processing the data stored in the memory. In order to enable an overall control of the machine while also placing a particularly low demand on the operator.

The driver assistance system, together with the particular working mechanisms provided for carrying out the treatment subprocesses, forms independently operating automated adjusting mechanisms which are utilized for optimizing the control of the working mechanisms for carrying out the treatment subprocesses. A process supervisor is assigned to the driver assistance system for controlling individual automated adjusting mechanisms and a data exchange of the automated adjusting mechanisms between one another, wherein the process supervisor is configured for interacting with an operator, wherein, by way of the interaction, at least one parameter of at least one control process, which has been stored in the memory for actuation by the process supervisor, can be edited. It is essential, in this case, that at least the working mechanisms involved in carrying out specific treatment subprocesses for processing crop are each controlled by an independently operating automated adjusting mechanism, the participation by which in the overall treatment process as well as the enabling of a data exchange with one another is determined by the process supervisor. The process supervisor has the task of optimizing the overall treatment process, in that the process supervisor influences the automated adjusting mechanisms in a targeted manner. An operator interaction is permitted in such a way that the operator can edit at least one parameter of the control process, which is the basis for the control of the automated adjusting mechanisms by the process supervisor. An operator within the scope of the invention is, for example, a driver of the combine harvester as a direct operator, or a person who is connected to the driver assistance system with the aid of a mobile data processing device, or, for example, an operations manager who is connected to the driver assistance system from a remote farm with the aid of a data processing device and who is an indirect operator due to a spatial separation from the combine harvester.

For this purpose, the process supervisor can be configured for autonomously optimizing the overall treatment process of the combine harvester, according to a strategic objective of the harvesting process, by controlling individual automated adjusting mechanisms in a coordinated manner. The strategic objective of the harvesting process can be specified to the driver assistance system from a selection of strategic objectives of the harvesting process. Selectable strategic objectives of the harvesting process are, for example, achieving a maximum throughput, a quality of the crop to be achieved, an efficient or balanced operation of the combine harvester, and the like. The selectable strategic objectives of the harvesting process can also be combined with one another, for example, by weighting individual strategic objectives of the harvesting process. The process supervisor can refer to the selected strategic objective of the harvesting process as the basis for autonomously optimizing the treatment subprocesses to be carried out by the working mechanisms by controlling individual automated adjusting mechanisms in a dedicated manner.

In this case, multiple different sub-strategies can be stored in order to carry out a particular treatment subprocess. The sub-strategies can be utilized by the particular automated adjusting mechanisms for optimizing the working mechanism assigned thereto. Sub-strategies can be specifications of the individual automated adjusting mechanisms for limits of weighting variables and/or adjustment variables, weightings, target values, and/or priorities.

Preferably, at least one control process can be stored for the control of individual automated adjusting mechanisms and the data exchange of the automated adjusting mechanisms with one another by the process supervisor. The control process encompasses existing dependencies between adjustment parameters and process quality parameters of the treatment subprocesses.

Preferably, the at least one control process, which has been stored for actuation by the process supervisor, can encompass existing dependencies between adjustment parameters and process quality parameters of the treatment subprocesses. Preferably, the at least one control process can be stored in the memory of the driver assistance system, to which the process supervisor is assigned. The at least one stored control process can take place on the basis of a set of rules or a controller structure. Adjustment parameters are to be understood to be working mechanism-specific machine parameters for adjusting crop handling means with the aid of at least one actuator system assigned to the crop handling means, the aforementioned machine parameters being independently determined by the automated adjusting mechanisms. Adjustment parameters of the working mechanism "front attachment" or "header" are, inter alia, cutterbar height, cutting angle, reel position, and the like. Crop handling means in the case of the header are, for example, cutterbars, reels, feed rollers, and the like, to which an actuator system is assigned in order to adjust and/or operate these crop handling means. The term "process quality parameters" is to be understood to mean, in the case of the working mechanism "header", pick-up losses, cut crop losses, bouncing grain losses, etc. Process quality parameters are an evaluation criterion for an optimal adjustment of the working mechanism by the automated adjusting mechanisms. The same applies for the further working mechanisms of the combine harvester provided for carrying out treatment subprocesses.

Moreover, the process supervisor can be configured for controlling one or multiple automated adjusting mechanisms in a coordinated manner and for carrying out a weighting shift, depending on the operating situation, with respect to attaining or retaining process quality parameters of at least one automated adjusting mechanism. In order to optimize the overall treatment process of the combine harvester, it can be necessary to subordinate the attainment or retention of a process quality parameter of the one working mechanism to the attainment or retention of a process quality parameter of the other working mechanism by changing the weighting. Specifying the harvesting process strategy directed to a maximum throughput of crop results in the particular working mechanisms being controlled by appropriate adjustment parameters, which have been independently determined by the corresponding automated adjusting mechanisms, in order to ensure a maximum throughput in each case. According to this strategic objective of the harvesting process "maximum throughput", an appropriate weighting of the process quality parameters of the particular working mechanisms takes place, in that, inter alia, higher crop losses and/or quality losses are accepted than is the case with the strategic objective of the harvesting process "quality of the crop". This can result in the situation, however, in which the working mechanism can become overloaded within individual treatment subprocesses, whereby the achievement of the strategic objective of the harvesting process "maximum throughput" is placed at risk. Due to the weighting being balanced in a way which is dependent on the operating situation, it is ensured that all working mechanisms of the combine harvester are optimized as a whole, in a coordinated manner.

Moreover, the process supervisor can be configured for controlling the at least one automated adjusting mechanism, on the basis of the weighting shift, in order to operate the relevant working mechanism, which is controlled by the particular automated adjusting mechanism, outside the particular optimal operating point. The operation of at least one working mechanism outside its particular optimal operating point is based on the idea of minimizing possible effects of the specific settings for the working mechanism on other, in particular, downstream, working mechanisms, which thwart the achievement of an overall optimization within the scope of the selected strategic objective of the harvesting process.

Moreover, the process supervisor can be configured for specifying deviating sub-strategies for at least one of the automated adjusting mechanisms. This can be the case when the achievement of an overall optimization cannot be ensured within the scope of the selected strategic objective of the harvesting process and the associated original sub-strategies due to changing external determining factors.

Moreover, the process supervisor can be configured for autonomously specifying adjustment limits, within which the automated adjusting mechanisms control the particular working mechanisms. Alternatively or additionally, the process supervisor can be configured for autonomously specifying target values of the process quality parameters, within which the automated adjusting mechanisms control the particular working mechanisms. Thus, a reduction of a portion of damaged grain, as the process quality parameter, can be achieved by reducing the target value for the process quality parameter "grain portion" in the tailings. This can be achieved, for example, by increasing the process quality parameter "threshed portion", in that the automated adjusting mechanism assigned to the working mechanism "threshing mechanism" appropriately changes the adjustment parameters. One further example is the reduction of the process quality parameter "loss limit", which can be expressed in different ways depending on the different working mechanisms, when another limiting value of the process quality parameters or the adjustment parameters has been reached, such as reaching the maximum engine load. Moreover, the process supervisor can differentiate between maximum values and setpoint values of process quality parameters or can use these as the basis for the control of the automated adjusting mechanisms. One example thereof is the adherence to the so-called tailings limit as the maximum value and the tailings level as the setpoint value.

In particular, the process supervisor can be configured for optimizing the overall treatment process during an operation of the combine harvester in partial-load operation. Thus, the strategic objective of the harvesting process "maximum throughput" cannot be reached, for example, due to a partial-load operation as a result of the ground speed. In order to nevertheless optimize the overall treatment process within the scope of such limiting conditions, the process supervisor can automatically shift or re-establish priorities.

Preferably, at least one adaptive family of characteristics can be assigned to at least one process quality parameter in order to form functional relationships of a treatment subprocess to be carried out by a working mechanism, wherein this at least one process quality parameter can be defined as an output quantity of the at least one characteristic map. On the basis of this functional relationship of a system model for a particular working mechanism, adjustment parameters can be inferred, depending on different operating situations, which make it possible to optimally carry out the treatment subprocess.

Moreover, the process supervisor can be configured for receiving external data which influence the process quality parameters of the treatment subprocesses. The external data can preferably be data and information which represent influences on the overall treatment process, which cannot be directly measured by sensor systems of the combine harvester. Such influences are, for example, the weather and/or deadlines which influence or limit an available time window for harvesting a field. External data are, therefore, inter alia, logistics data which can influence the carrying out of the overall treatment process. The external data can also encompass an input entered by the indirect or direct operator of the combine harvester. Logistics data encompass, for example, deadlines for the harvesting of a cutting area or the coordination of the combine harvester as a harvesting vehicle within a harvesting logistics chain comprising multiple harvesting and/or transport vehicles. For this purpose, the process supervisor can receive external data of a fleet management system, which contain information regarding a cutting area to be worked as well as information regarding the available transport quantities. External data can also be transmitted to other harvesting or transport vehicles of the harvesting logistics chain. Therefore, the process supervisor can adapt individual sub-strategy specifications of the automated adjusting mechanisms Thus, for example, in the event that the available transport capacity is limited, the process quality parameter "throughput" of the combine harvester can be adapted thereto by way of an appropriate control of the automated adjusting mechanisms, while the goal attainment of other process parameters regarding the quality of the result or losses of the working mechanisms can be taken into account to a greater extent by way of an appropriate control of the automated adjusting mechanisms.

In particular, the process supervisor can be configured for autonomously deriving measures depending on the external data which are received. Thus, the process supervisor can adapt sub-strategy specifications, as a measure, with consideration for the external data. For example, change the limits of the process quality parameters or change sub-strategies of the automated adjusting mechanisms. One further measure can be that of planning maintenance or adjustment measures which make it necessary to interrupt the harvesting operation. The maintenance or adjustment measures can be integrated into the harvesting process sequence, on the basis of the available logistics data, in order to minimize the interruption of the harvesting operation. Examples of such maintenance or adjustment measures are the inspection and/or calibration of sensors of the combine harvester, refurbishment of the threshing mechanism, or other adjustments of working mechanisms which can be carried out only when there is no material flow in the combine harvester or which cannot be carried out from within the cab.

According to one embodiment, the working mechanisms provided are at least a front attachment, in particular, a grain cutterbar, a threshing mechanism, a separating mechanism, which can be designed as a tray-type shaker or as an axial separating mechanism comprising one or two separating rotors, a cleaning mechanism, as well as a spreading mechanism. The spreading mechanism can be a chaff spreader, a chopper, as well as a spreading unit for spreading at least the crop made available by the chopper.

For the purpose of controlling these working mechanisms, at least an automated front attachment, an automated threshing mechanism, an automated separating mechanism, an automated cleaning mechanism, as well as an automated spreader can be provided as automated adjusting mechanisms. The functional relationships for each treatment subprocess are preferably stored in the memory of the driver assistance system, which is accessed by the particular automated adjusting mechanisms for autonomously determining the adjustment parameters of the corresponding working mechanism. The functional relationships are continuously adapted to the present harvesting process state during the harvesting operation.

Moreover, it is advantageous when at least one automated adjusting mechanism comprises at least two subordinate automated adjusting mechanisms. In this way, the complexity of the control of the treatment subprocesses of a working mechanism can be reduced, due to the fact that the treatment subprocess is subdivided in finer detail. This is advantageous in the case of the automatic determination of adjustment parameters by the subordinate automated adjusting mechanisms. Thus, the automated front attachment can comprise an automated reel and an automated intake conveyor mechanism, as the subordinate automated adjusting mechanisms, the mode of operation of which corresponds to that of the other automated adjusting mechanisms.

According to one refinement, the process supervisor can be configured for receiving and adjusting at least one objective for a strategic objective of the harvesting process and/or at least one process quality parameter as external data on the basis of the interaction with the operator. For this purpose, a direct adjustment of at least one process quality parameter can be carried out by the operator, by way of the operator predefining a maximum value or a minimum value. For example, an unwanted portion, i.e., the proportion of material other than grain in the grain tank, of 1% can be predefined as the minimum value. Alternatively or additionally, a trend for a process quality parameter to be sought can likewise be predefined by the operator or the process supervisor as an objective. For example, a maximum value of 70% can be predefined for a tailings volume on the basis of a sub-strategy. In addition, the operator can directly predefine a trend by way of the interaction with the process supervisor, with the goal of achieving a preferably low tailings volume.

Preferably, the process supervisor can be configured for interacting with the operator in a voice-assisted manner. The interaction between the process supervisor and the operator can take place, in particular, via natural language. A voice-assisted interaction facilitates the communication between the process supervisor and the operator. The voice-assisted interaction can take place in the form of dialogs visualized with the aid of the graphical user interface or via voice input and voice output. The initiation of the interaction can take place by the process supervisor or by the operator, depending on the situation.

According to one refinement, the process supervisor can be configured for detecting and evaluating the indirect or direct interaction taking place between the driver assistance system and the operator. On the basis thereof, possible problems can be identified, for the solution of which proposals can be presented, in a targeted manner, in an interactive dialog initiated by the process supervisor. A detectable indirect interaction is, for example, frequently traveling in reverse or repeatedly changing the ground speed during a harvesting operation, which is carried out by the operator. A detectable direct interaction is the frequency of queries to the driver assistance system overall or in the context, for example, of an adjustment of a certain working mechanism.

Moreover, the process supervisor can be configured for automatically entering into an interaction with the operator due to plausibility checks and/or due to an analysis of an overall control of the machine. For this purpose, the data, which are made available by the sensor systems of the combine harvester and are evaluated by the computing device, can be checked for plausibility. The data can be the process quality parameters as well as measured values of the various sensor systems. In the event that implausible data for process quality parameters and/or measured values are detected, the plausibility check can result in the process supervisor starting a needs-based interaction dialog in order to remedy the situation. The process supervisor can propose the calibration of a sensor or the adaptation of adjustment limits of a process quality parameter as possible measures for remedying the situation. The result of an analysis of the overall control of the machine can also be utilized in order to automatically enter into an interaction with the operator and to remedy the situation within the scope of a needs-based interactive dialog.

According to one refinement, the process supervisor can be configured for controlling the graphical user interface in the case of a modification of a strategic objective of the harvesting process or a sub-strategy carried out by an operator, in order to visualize resultant modifications of adjustment limits of at least one process quality parameter. The operator is therefore provided with a direct overview of the responses of the process supervisor derived from the modification of a strategic objective of the harvesting process or a sub-strategy.

The graphical user interface can be configured for visualizing the adjustment limits on the basis of absolute values of the at least one process quality parameter. For this purpose, the particular minimum and maximum values of the at least one process quality parameter can be displayed, preferably with the aid of geometric shapes.

Moreover, the graphical user interface can be configured for visualizing a trend of the at least one process quality parameter. For this purpose, at least one trend indicator can be provided, which can be activated by the operator.

According to one preferred refinement, the graphical user interface can be configured for additionally displaying a current actual value of the at least one process quality parameter. This makes it possible for the operator to promptly track the influence or the effects of the changes he/she made within the scope of the interaction with the process supervisor.

Moreover, the problem described at the outset is solved by a method for operating a combine harvester which comprises multiple working mechanisms for carrying out specific treatment subprocesses of an overall treatment process for processing crop, and a driver assistance system for controlling the working mechanisms, which includes a memory for storing data, a computing device for processing the data stored in the memory, and a graphical user interface, which method is characterized in that the driver assistance system, together with the particular working mechanisms provided for carrying out the treatment subprocesses, forms independently operating automated adjusting mechanisms which are utilized for optimizing the control of the working mechanisms for carrying out the treatment subprocesses, wherein a control of individual automated adjusting mechanisms and a data exchange of the automated adjusting mechanisms between one another is carried out by a process supervisor assigned to the driver assistance system, wherein the process supervisor is configured for interacting with an operator, wherein, by way of the interaction, at least one parameter of at least one control process, which has been stored in the memory for actuation by the process supervisor, is edited.

BRIEF DESCRIPTION OF THE DRAWINGS

The present invention is explained in greater detail in the following with reference to an exemplary embodiment depicted in the drawings. In the drawings:

FIG. 4 shows a schematic representation of a visualization of a user interface for adjusting a strategic objective of the harvesting process and a corresponding process quality parameter.

DETAILED DESCRIPTION OF THE EMBODIMENTS

Figure 1:
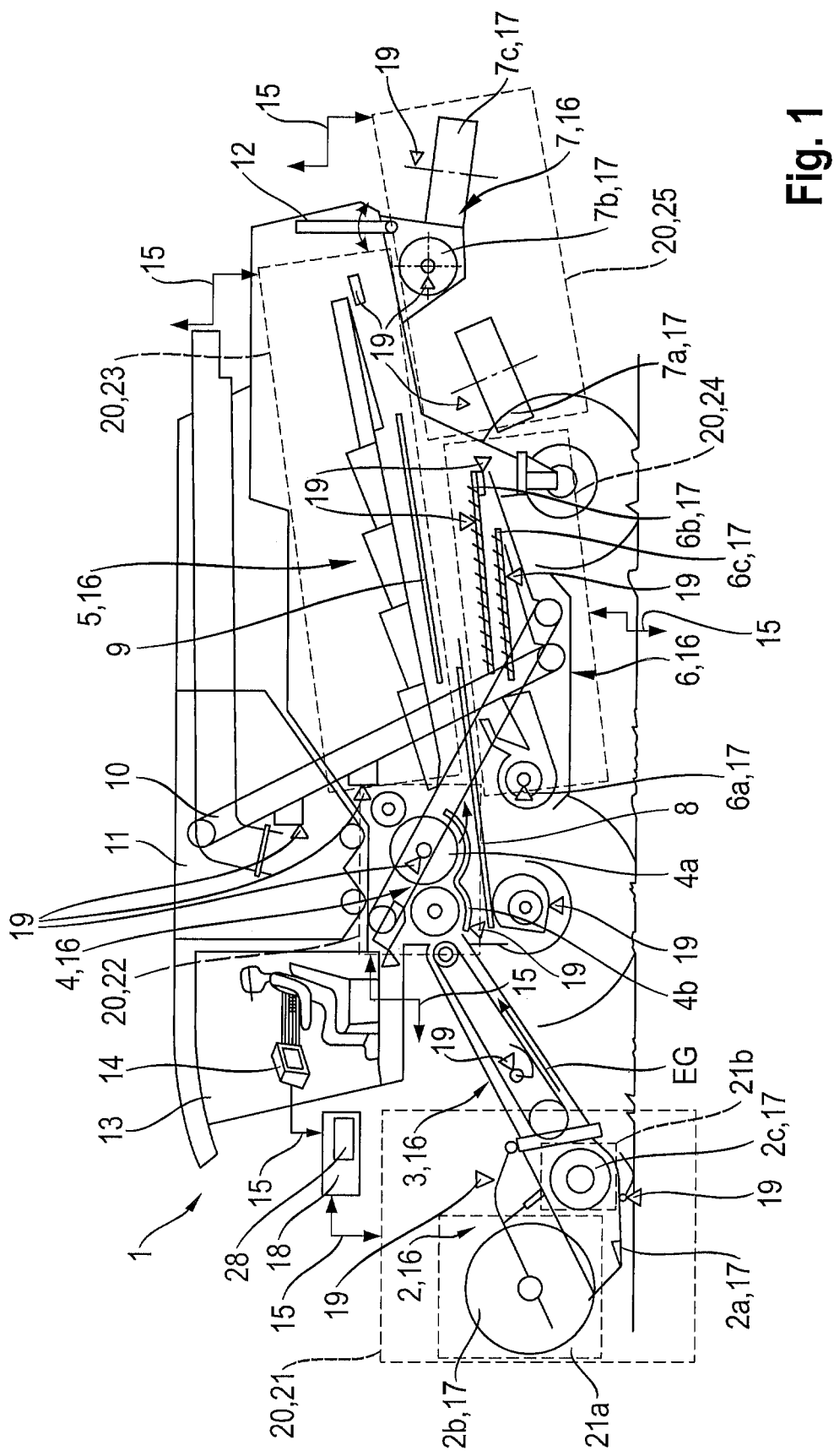
FIG. 1 shows a schematic representation of a side view of a combine harvester.

A combine harvester 1 schematically represented in FIG. 1 accommodates, in the front region thereof, a front attachment designed as a header 2 which is connected in a manner known per se to a feeder 3 of the combine harvester 1. A crop stream EG passing through the feeder 3 is transferred from the feeder 3 to a threshing mechanism 4 of the combine harvester 2. An emerging partial material stream of the crop stream EG, which essentially contains material other than grain, such as chaff and straw, is transferred by the threshing mechanism 4 to a separating mechanism 5 designed as a tray-type shaker. A further partial material stream, which essentially contains grains separated from the crop, passes from the threshing mechanism 4 to a grain pan 8. It lies within the scope of the invention that the separating mechanism 5 can also be designed as a separating rotor which is known per se and, therefore, is not represented. The partial material stream of the crop stream EG is conveyed by the separating mechanism 5 in such a way that any freely movable grains contained in the partial material stream are separated out in the underside area of the separating mechanism 5. The grains separated out of the crop stream EG by the threshing mechanism 4 and by the separating mechanism 5 are fed via a return pan 9 and a grain pan 8 to a cleaning mechanism 6. From the cleaning mechanism 6, a cleaned grain stream finally enters a grain tank 11 of the combine harvester 1 with the aid of a conveyor device 10.

A chopping and spreading mechanism 7 is installed downstream from the separating mechanism 5 in the rear region of the separating mechanism 5 which is designed as a tray-type shaker. Straw emerging from the separating mechanism 5 in the rear region thereof is fed to the chopping and spreading mechanism 7. The straw is optionally deposited directly on the ground in a swath or is chopped up by the chopping and spreading mechanism 7, and is preferably deposited on the ground, essentially spread across the width of the front attachment 2. A so-called straw flap 12 is provided for depositing the straw on the ground, with the aid of which the straw is diverted past the chopping and spreading mechanism 7.

The front attachment 2 designed as a grain cutterbar comprises an oscillatingly driven cutterbar 2a, a variable-position reel 2b, and an intake auger 2c. The threshing mechanism 4 comprises at least one threshing cylinder 4a which is driven in a variable-speed manner and is encased on the underside, in sections, by at least one threshing concave 4b. The threshing mechanism 4 is preferably designed as a multiple-cylinder threshing mechanism. The distance of the threshing concave 4b to the at least one threshing cylinder 4a is variable. The opening width of the threshing concave 4b is variable. The cleaning mechanism 6 comprises a variable-speed fan 6a and a variable-inclination sieve arrangement including at least one upper sieve 6b and one lower sieve 6c. The upper sieve 6b and the lower sieve 6c are oscillatingly driven and comprise sieve openings having a variable opening width. The chopping and spreading mechanism 7 comprises a chaff conveyor 7a, a chopper 7b, which is driven in a variable-speed manner, and a spreading mechanism 7c. The spreading mechanism 7c is preferably designed as a radial spreader. The chopper 7b comprises a rotationally driven cutting cylinder and a variable-position counter-knife arrangement. The chaff conveyor 7a can be operated as a chaff ejector blower, which feeds the chaff to the spreading mechanism 7c in order to be spread, together with the chopped straw, by the spreading mechanism 7c, or as a chaff distributor fan which spreads the chaff directly on the ground.

The front attachment 2, the threshing mechanism 4, the separating mechanism 5, the cleaning mechanism 6, as well as the chopping and spreading mechanism 7 are referred to in the following, in general, as working mechanisms 16 which are utilized for carrying out working mechanism-specific treatment subprocesses of an overall treatment process. The components 2a, 2b, 2c, 4a, 4b, 6a, 6b, 6c, 7a, 7b, and 7c of the working mechanisms 16, the list of which is not conclusive, are referred to in the following, in general, as crop handling means 17.

Moreover, the combine harvester 1 comprises a driver's cab 13, in which at least one graphical user interface 14 is situated. The graphical user interface 14 is connected to a bus system 15 of the combine harvester 1. A driver assistance system 18 communicates, via the bus system 15, in a way known per se, with the graphical user interface 14 and with a plurality of sensor systems 19. Details regarding the structure of the sensor systems 19 are described in the unexamined patent application DE 101 47 733 A1. Reference is hereby made to the entire contents of the aforementioned unexamined patent application, and so the structure of the sensor systems 19 will not be described once again in the following.

The driver assistance system 18 is provided for controlling the working mechanisms 16, wherein the driver assistance system 18 is intended for assisting an operator of the combine harvester 1 in the optimization of the adjustment of the working mechanisms 16 with consideration for harvesting conditions. For this purpose, the front attachment 2, the threshing mechanism 4, the separating mechanism 5, the cleaning mechanism 6, as well as the chopping and spreading mechanism 7 each form, together with the driver assistance system 18, an autonomous, working mechanism-specific automated adjusting mechanism 20. An automated front attachment 21, an automated threshing mechanism 22, an automated separating mechanism 23, an automated cleaning mechanism 24, and an automated spreader 25 are provided as automated adjusting mechanisms 20. Each of the automated adjusting mechanisms 20 can comprise subordinate automated adjusting mechanisms which are utilized for autonomously controlling various crop handling means 17 of a working mechanism 16. Thus, the automated front attachment 20 can comprise two subordinate automated adjusting mechanisms, an automated reel 21a, which is utilized for controlling the reel 2b, and an automated intake conveyor mechanism 21b which is utilized for controlling the intake auger 2c. With the aid of the driver assistance system, independently operating automated adjusting mechanisms 20 are formed by the particular working mechanisms 16 provided for carrying out treatment subprocesses. The automated adjusting mechanisms 20 are utilized for optimizing the control of the working mechanisms 16 for carrying out the treatment subprocesses. Treatment subprocesses of the front attachment 2 are the crop intake by the reel 2b and the conveyance of the crop stream EG through the intake auger 2c. Treatment subprocesses of the threshing mechanism 4, the separating mechanism 5, the cleaning mechanism 6, and the chopping and spreading mechanism 7 are therefore, in particular, the threshing, separation, cleaning, and chopping and spreading of the crop stream EG.

Figure 2:
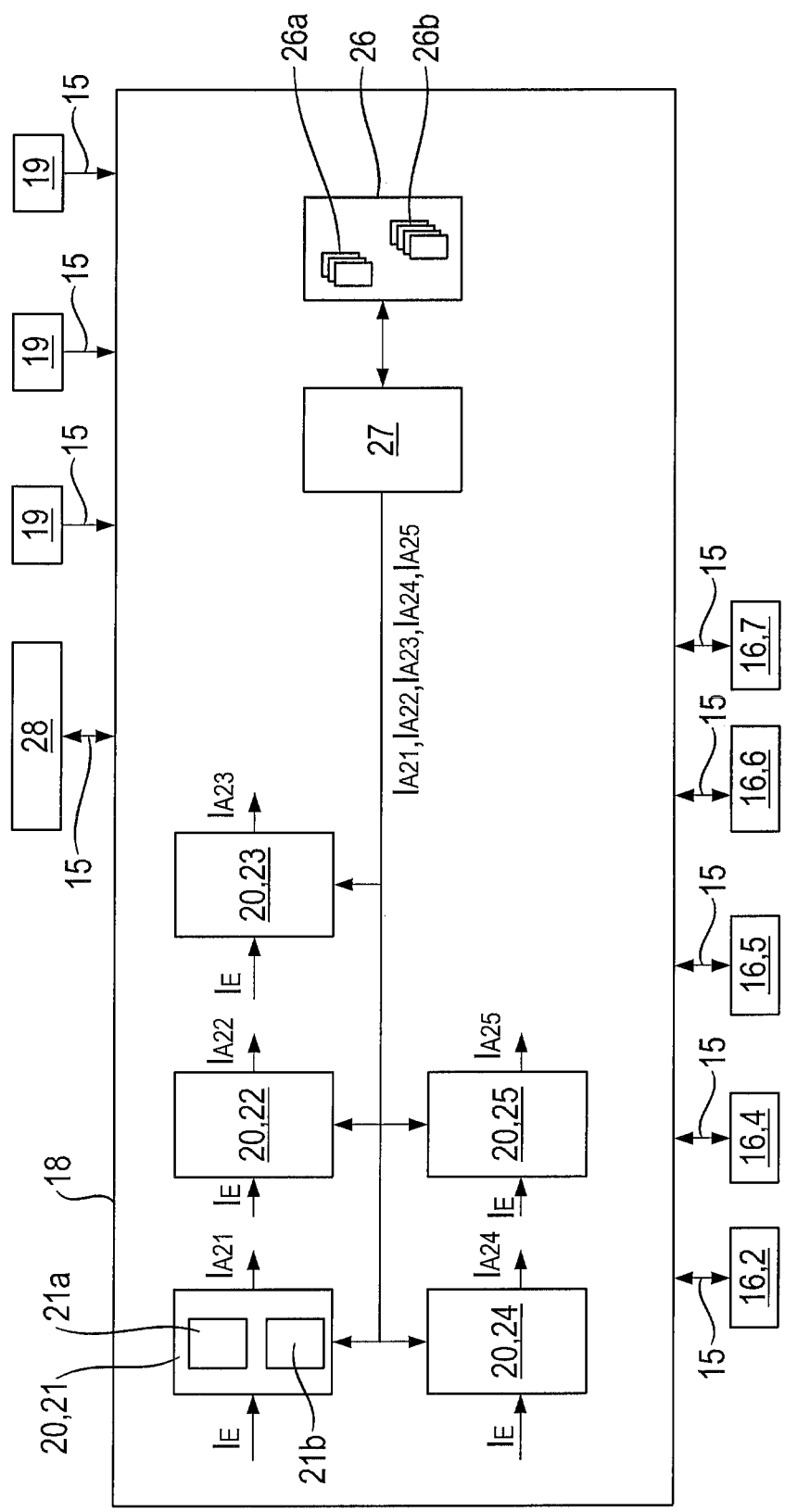
FIG. 2 shows a schematic representation of the operating principle of automated adjusting mechanisms.

The operating principle of the automated adjusting mechanisms 20 is represented schematically in FIG. 2. The driver assistance system 18 comprises a memory 26 as well as a computing device 27 for processing data stored in the memory 26. Data of the individual working mechanisms 16 or their crop handling means 17, which have been gathered by the sensor systems 19, are made available to the particular automated adjusting mechanism 20 as input data $I_E$. The automated adjusting mechanisms 20 autonomously generate working mechanism-specific output data $I_{A21}$, $I_{A22}$, $I_{A23}$, $I_{A24}$, $I_{A25}$, respectively, which are utilized for changing adjustment parameters of the associated working mechanisms 16 or their crop handling means 17. The working mechanism-specific output data $I_{A21}$, $I_{A22}$, $I_{A23}$, $I_{A24}$, $I_{A25}$ are made available by the driver assistance system 18 not only to the particular specific automated adjusting mechanism 20, but also to all other automated adjusting mechanisms 20.

Strategic objectives of the harvesting process 26a are selectably stored in the memory 26 for carrying out the overall treatment process of the combine harvester 1. The strategic objectives of the harvesting process 26a can be displayed and selected with the aid of the graphical user interface 14. Selectable strategic objectives of the harvesting process 26a are, for example, achieving a maximum throughput, a quality of the processed crop to be achieved with respect to cleanliness and/or portion of damaged grain, an efficient operation of the combine harvester 1, and the like. A plurality of sub-strategies 26b is selectably stored in the memory 26, in each case, for the formation of the automated adjusting mechanisms 20 by the driver assistance system 18 and the particular working mechanism 16. The particular sub-strategy 26b selected for an automated adjusting mechanism 20 is implemented by the computing device 27, in that the computing device 27 autonomously determines the adjustment parameters and specifies these to the appropriate working mechanism 16.

At least one adaptive family of characteristics is assigned to at least one process quality parameter in order to form functional relationships of a treatment subprocess to be carried out by the particular working mechanism 16. This at least one process quality parameter is defined as an output quantity of the at least one characteristic map. On the basis of this functional relationship of a system model for the particular working mechanism 16, adjustment parameters of the working mechanisms 16 are inferred by the automated adjusting mechanisms 20 depending on the different operating situations. The adjustment parameters make it possible to carry out the particular treatment subprocess in an optimized manner. The data gathered by the sensor systems 19 is utilized for the cyclic adaption of the families of characteristics.

The driver assistance system 18, which, together with the particular working mechanisms 16 provided for carrying out the treatment subprocesses, forms independently operating automated adjusting mechanisms 20 which are utilized for optimizing the control of the working mechanisms 16 for carrying out the treatment subprocesses, further comprises a process supervisor 28. The process supervisor 28 is assigned to the driver assistance system 18. In particular, the process supervisor 28 can be integrated into the driver assistance system 18. The process supervisor 28 is configured for activating individual automated adjusting mechanisms 20 and for enabling a data exchange between the automated adjusting mechanisms 20. The process supervisor 28 has the task of autonomously optimizing the overall treatment process of the combine harvester 1 according to a selected strategic objective of the harvesting process by controlling the individual automated adjusting mechanisms 20 in a coordinated manner. This takes place by way of the process supervisor 28 controlling individual or all automated adjusting mechanisms 20 with the aid of at least one control process which is designed as a set of rules or a controller structure, wherein the implementation in the case of the process supervisor 28 integrated into the driver assistance system 18 takes place with the aid of the computing device 27. The at least one control process for controlling the automated adjusting mechanisms 20 and the data exchange with the aid of the process supervisor 28 is stored in the memory 26. The at least one control process encompasses and takes into account existing dependencies between adjustment parameters and process quality parameters of the treatment subprocesses.

Figure 3:
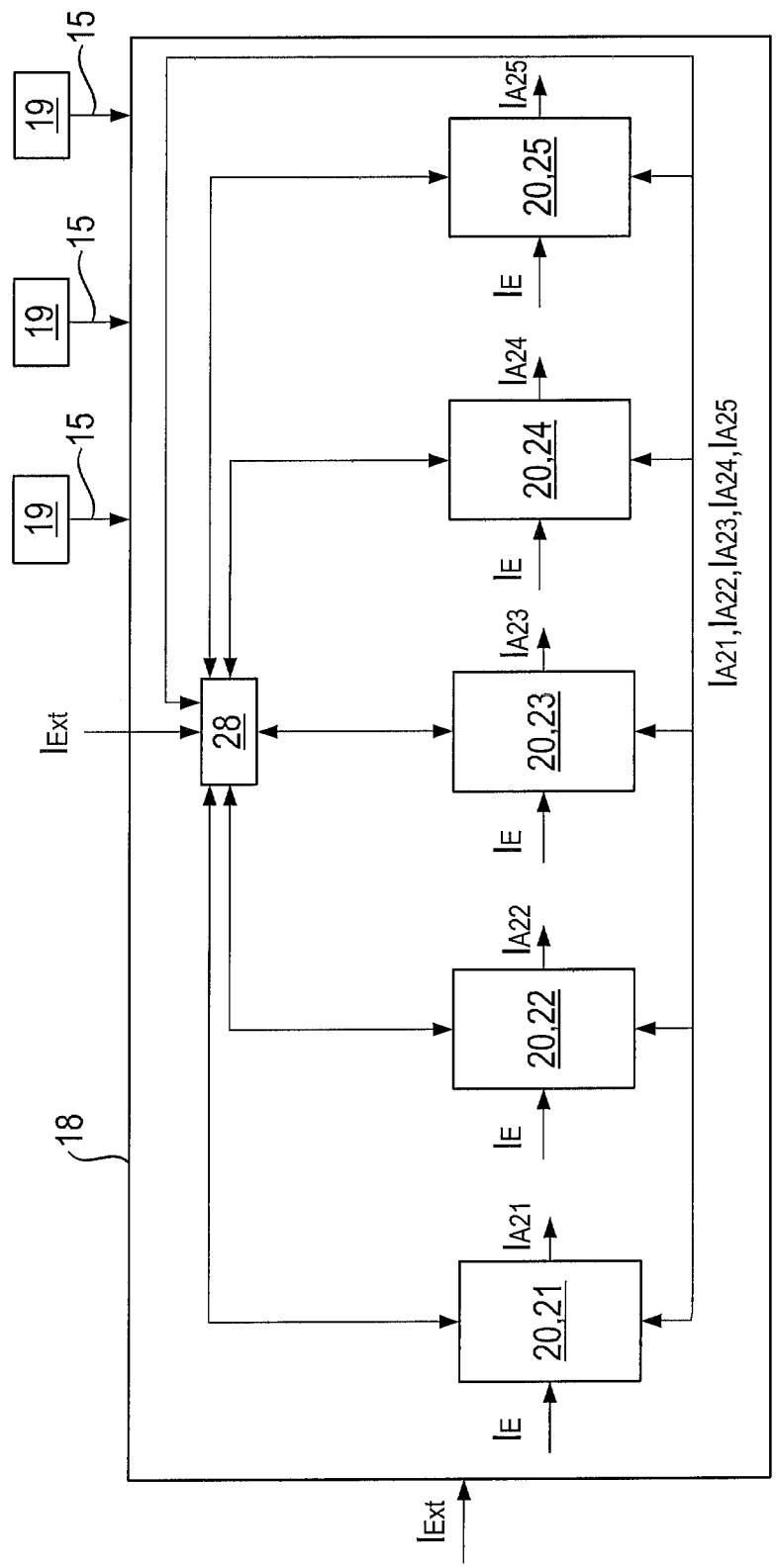
FIG. 3 shows a schematic representation of the operating principle of a process supervisor.

FIG. 3 shows a schematic representation of the operating principle of the process supervisor 28. The process supervisor 28 coordinates and manages the automated adjusting mechanisms 20 in such a way that a communication of the automated adjusting mechanisms 20 for the purpose of exchanging their output data $I_{A21}$, $I_{A22}$, $I_{A23}$, $I_{A24}$, $I_{A25}$ with one another is triggered by the process supervisor 28. The particular output data $I_{A21}$, $I_{A22}$, $I_{A23}$, $I_{A24}$, $I_{A25}$ of the automated adjusting mechanisms 20 are either initially transferred to the process supervisor 28, which forwards these data to at least one other automated adjusting mechanism 20, or directly transfers these data to at least one other automated adjusting mechanism 20, wherein the process supervisor 28 generates an appropriate instruction for the transfer.

The driver assistance system 18 as well as the process supervisor 28 are configured for taking external data $I_{Ext}$ into account. In particular, the external data $I_{Ext}$ encompass information regarding external influences which cannot be directly measured by the sensor systems 19 of the combine harvester 1. External data are, inter alia, current weather data as well as logistics data which can influence the carrying out of the overall treatment process. These can also include, however, an input entered by the operator of the combine harvester as well as a strategic objective of a person coordinating the operation of harvesting vehicles, such as an operational manager of a farmer's principal place of business, or a contractor. Logistics data encompass, for example, deadlines for the harvesting of a cutting area or the coordination of the combine harvester 1 as a harvesting vehicle within a harvesting logistics chain comprising multiple harvesting and/or transport vehicles. For this purpose, the process supervisor 28 or the driver assistance system 18 is configured for receiving external data $I_{Ext}$ of a central fleet management system, which contain not only information regarding a cutting area to be processed but also information regarding the available transport quantities. External data $I_{Ext}$ can also be transmitted by other harvesting and/or transport vehicles which are part of the harvesting logistics chain. On the basis thereof, the process supervisor 28 adapts individual objectives of the sub-strategies 26b of the automated adjusting mechanisms 20. Thus, for example, in the event that the available transport capacity is limited, the process quality parameter "throughput" of the combine harvester 1 can be adapted thereto by way of an appropriate control of the automated adjusting mechanisms 20, in particular, of the automated front attachment 21 and the automated threshing mechanism 22, in order to reduce the throughput. Simultaneously, the goal attainment of other process parameters regarding the quality of the result or losses of the working mechanisms 16 can be taken into account to a greater extent by way of an appropriate control of the automated adjusting mechanisms 20. For this purpose, the sub-strategies 26b are autonomously adapted or are specified in a deviating manner by the process supervisor 28.

In addition, the process supervisor 28 autonomously derives measures from the external data, which are integrated into the overall treatment process of the combine harvester 1 in order to design the overall treatment process to be as optimal as possible. Thus, for example, occurring waiting times, which can be derived from the external data $I_{Ext}$ for logistics planning, can be utilized for signaling that maintenance, refurbishing, or adjustment work, which may be necessary, can be carried out by the operator of the combine harvester 1. Thus, the carrying out of an inspection and, if necessary, an adaptation of the calibration of individual sensors of the system systems 19 can be proposed by the process supervisor 28, for example, within such a waiting time. Likewise, maintenance work which merely requires that the material flow through the combine harvester 1 be stopped or that the cab be exited, such as the adjustment of threshing concave flaps, can be proposed by the process supervisor 28.

In order to optimize the overall treatment process, the process supervisor 28 coordinates the automated adjusting mechanisms 20 with respect to the carrying out of the treatment subprocesses. The process supervisor 28 is configured for controlling one or multiple automated adjusting mechanisms 20 in a coordinated manner and for carrying out a weighting shift, depending on the operating situation, with respect to the attainment or retention of process quality parameters, which are specified within the scope of the selected sub-strategy 26b, of at least one automated adjusting mechanism 20. In this case, a sub-optimal operation of at least one working mechanism 16 is accepted when this benefits the objective of the optimized overall treatment process. In addition to the autonomous specification of deviating sub-strategies 26b by the process supervisor 28, adjustment limits or target values for the process quality parameters of one or multiple automated adjusting mechanisms 20 can also be autonomously changed by way of the process supervisor 28. Thus, a reduction of a portion of damaged grain, as the process quality parameter, can be achieved by reducing the target value for the process quality parameter "grain portion" in the tailings. This can be achieved, for example, by increasing the process quality parameter "cleanliness", in that the automated cleaning mechanism 24 assigned to the cleaning mechanism 6 appropriately changes one or multiple adjustment parameters such as the sieve opening width.

One further example is the reduction of the process quality parameter "loss limit", which can be expressed in different ways depending on the different working mechanisms 16, when another limiting value of the process quality parameters or the adjustment parameters has been reached, such as reaching the maximum engine load.

The process supervisor 28 is also configured for optimizing the overall treatment process during an operation of the combine harvester 1 in partial-load operation. If, for example, the combine harvester 1 is operated at a ground speed on the field to be harvested, which is below a ground speed of the possible maximum throughput of crop, while the strategic objective of the harvesting process "maximum throughput" was selected by the operator, the process supervisor 28 utilizes the available resources of the working mechanisms 16 in order to change or prioritize their objectives of the sub-strategies 26b. As a part thereof, the target values for the process quality parameters "loss limit" or "portion of damaged grain" can be changed by the process supervisor 28 in order to achieve a higher quality during the processing of the crop stream EG.

The representation in FIG. 4 shows, by way of example, a schematic representation of a visualization of a user interface by the graphic user interface 14 for displaying and adjusting a selected strategic objective of the harvesting process 26a or a sub-strategy 26b and at least one corresponding process quality parameter, which is cleanliness, by way of example, in the represented exemplary embodiment. One alternative embodiment of a virtual control element 29 is designed as a sliding actuator comprising only one virtual adjusting element 32 in the represented embodiment variant. An embodiment of the virtual control element 29 as a rotary actuator is likewise conceivable. The reference character 30 marks, by way of example, a display element of a process quality parameter "high cleanliness" and the reference character 31 marks, by way of example, a display element of a process quality parameter "high throughout", which result from the selected strategic objective of the harvesting process 26a. The display elements 30, 31 can be designed as actuatable buttons, via the actuation of which the virtual adjusting element 32 can be displaced.

In addition, a further virtual control element 34, which is likewise designed as a sliding actuator, is shown as an alternative embodiment and which likewise visualizes the process quality parameters "high cleanliness" and "high throughput" and allows for the adjustment thereof with the aid of the display elements 30, 31. For this purpose, the virtual control element 34 comprises two virtual adjusting elements 35 and 36. The virtual adjusting element 35 represents a minimum value of the adjustment limit of the process quality parameter "high cleanliness", visualized by the display element 30, while the other virtual adjusting element 36 represents a maximum value of the adjustment limit of the process quality parameter "high cleanliness". The setting or adjustment of the adjustment limits takes place within the scope of the overall optimization, as described above, initially autonomously by the process supervisor 28. In addition, the weighting of the selected strategic objective of the harvesting process 26a can be changed via an interaction of the operator with the process supervisor 28, in that the operator moves the virtual adjusting element 32 in the arrow direction 33 in the direction of the process quality parameter "high cleanliness" or, as shown, in the direction of the process quality parameter "high throughput", visualized by the display element 31, as indicated by the virtual adjusting element 32' depicted using dashed lines. The resultant change of the adjustment limits for the process quality parameter "high cleanliness" represented by way of example is illustrated by the virtual adjusting elements 35' and 36', which are also depicted using dashed lines.

A change of the adjustment limits can likewise be effectuated within the scope of the interaction between the operator and the process supervisor 28, in that the virtual adjusting element 35 for the minimum value of the adjustment limit and the virtual adjusting element 36 for the maximum value of the adjustment limit are moved by the operator according to the arrow direction 33. This direct influence of the adjustment limits for the process quality parameter "high cleanliness" is taken into account by the process supervisor 28 in the overall optimization.

Moreover, the operator can predefine a sought trend by selecting a trend indicator 37, 37', which is to be taken into account by the process supervisor 28 in the control of the automated cleaning mechanism 24.

Moreover, a current actual value 38 of the relevant process quality parameter is additionally represented by the virtual control elements 29 and 34. This makes it possible for the operator to promptly track the influence or the effects of the changes he/she made within the scope of the interaction with the process supervisor 28.

| List of reference characters | |
|---|---|
| 1 | combine harvester |
| 2 | front attachment |
| 2a | cutterbar |
| 2b | reel |
| 2c | intake auger |
| 3 | feeder |
| 4 | threshing mechanism |
| 4a | threshing cylinder |
| 4b | threshing concave |
| 5 | separating mechanism |
| 6 | cleaning mechanism |
| 6a | fan |
| 6b | upper sieve |
| 6c | lower sieve |
| 7 | chopping and spreading mechanism |
| 7a | chaff conveyor |
| 7b | chopper |
| 7c | spreading unit |
| 8 | grain pan |
| 9 | return pan |
| 10 | conveyor device |
| 11 | grain tank |
| 12 | straw flap |
| 13 | driver's cab |
| 14 | user interface |
| 15 | bus system |
| 16 | working mechanism |
| 17 | crop handling means |
| 18 | driver assistance system |
| 19 | sensor system |
| 20 | automated adjusting mechanism |
| 21 | automated front attachment |
| 21a | automated reel |
| 21b | automated intake conveyor mechanism |
| 22 | automated threshing mechanism |
| 23 | automated separating mechanism |
| 24 | automated cleaning mechanism |
| 25 | automated spreader |
| 26 | memory |
| 26a | strategic objective of the harvesting process |
| 26b | sub-strategy |
| 27 | computing device |

-continued

| | List of reference characters |
|---|---|
| 28 | process supervisor |
| 29 | virtual sliding controller |
| 30 | display element |
| 31 | display element |
| 32, 32' | virtual adjusting element |
| 33 | displacement direction |
| 34 | visualization element |
| 35, 35' | virtual adjusting element |
| 36, 36' | virtual adjusting element |
| 37 | trend indicator |
| 38 | actual value |
| EG | crop stream |
| $I_E$ | input data |
| $I_{A21}$ | output data |
| $I_{A22}$ | output data |
| $I_{A23}$ | output data |
| $I_{A24}$ | output data |
| $I_{Ext}$ | external data |

What is claimed is:

1. A combine harvester comprising:
multiple working mechanisms configured carrying out specific treatment subprocesses of an overall treatment process for processing crop,
a driver assistance system configured for controlling the multiple working mechanisms, the driver assistance system including a memory for storing data regarding parameters of at least one control process, a computing device for processing the data stored in the memory, and a graphical user interface,
wherein the driver assistance system, together with the multiple working mechanisms provided for carrying out the specific treatment subprocesses, forms independently operating automated adjusting mechanisms which are configured to be utilized for optimizing control of the working mechanisms for carrying out the treatment subprocesses,
wherein the driver assistance system further comprises a process supervisor that is configured for controlling the independently operating automated adjusting mechanisms and a data exchange between the independently operating automated adjusting mechanisms,
wherein the process supervisor is configured for interacting with an operator, so that at least one parameter of the at least one control process, which has been stored in the memory for actuation by the process supervisor, can be edited,
wherein the process supervisor is configured for autonomously optimizing the overall treatment process of the combine harvester, according to a strategic objective of a harvesting process, by controlling the independently operating automated adjusting mechanisms in a coordinated manner,
wherein each independently operating automatic adjusting mechanism receives input data and autonomously generates respective working mechanism-specific output data from the input data, and wherein the output data are used to change adjustment parameters of the working mechanisms.

2. The combine harvester as claimed in claim 1, wherein multiple different sub-strategies are stored in order to carry out the specific treatment subprocess and are configured to be utilized by the particular automated adjusting mechanisms for optimizing the working mechanism assigned thereto.

3. The combine harvester as claimed in claim 1, wherein the process supervisor is configured for controlling one or multiple of the independently operating automated adjusting mechanisms in a coordinated manner and for carrying out a weighting shift, depending on an operating situation, with respect to attainment or retention of process quality parameters of at least one of the automated adjusting mechanisms.

4. The combine harvester as claimed in claim 3, wherein the process supervisor is configured for controlling the at least one automated adjusting mechanism, on the basis of the weighting shift, in order to operate the working mechanism, which is controlled by the automated adjusting mechanism, outside a particular optimal operating point.

5. The combine harvester as claimed in claim 3, wherein the process supervisor is configured for autonomously specifying sub-strategies, on the basis of which the automated adjusting mechanisms control the particular working mechanisms.

6. The combine harvester as claimed in claim 1, wherein the process supervisor is configured for autonomously specifying adjustment limits, within which the automated adjusting mechanisms control the particular working mechanisms.

7. The combine harvester as claimed in claim 1, wherein the process supervisor is configured for autonomously specifying target values of process quality parameters, within which the automated adjusting mechanisms control the multiple working mechanisms.

8. The combine harvester as claimed in claim 1, wherein the process supervisor is configured for optimizing the overall treatment process during an operation of the combine harvester in partial-load operation.

9. The combine harvester as claimed in claim 1, wherein at least one adaptive family of characteristics is assigned to at least one process quality parameter in order to form functional relationships of a treatment subprocess to be carried out by one of the working mechanisms, and this at least one process quality parameter is defined as an output quantity of at least one characteristic map.

10. The combine harvester as claimed in claim 9, wherein the process supervisor is configured for receiving external data ($I_{Ext}$) which influence the process quality parameters of the treatment subprocesses.

11. The combine harvester as claimed in claim 10, wherein the process supervisor is configured for autonomously deriving measures depending on the external data ($I_{Ext}$) which are received.

12. The combine harvester as claimed in claim 1, wherein the working mechanisms provided are at least a front attachment, a threshing mechanism, a separating mechanism, a cleaning mechanism, and a spreading mechanism.

13. The combine harvester as claimed in claim 1, wherein the automated adjusting mechanisms comprise at least an automated front attachment, an automated threshing mechanism, an automated separating mechanism, an automated cleaning mechanism, and an automated spreader.

14. The combine harvester as claimed in claim 1, wherein at least one automated adjusting mechanism comprises at least two subordinate automatic adjusters.

15. The combine harvester as claimed in claim 1, wherein the process supervisor is configured for receiving and adjusting at least one objective for a strategic objective of the harvesting process and/or at least one process quality parameter as external data ($I_{Ext}$) on the basis of the interaction with the operator.

16. The combine harvester as claimed in claim 1, wherein the process supervisor is configured for interacting with the operator in a voice-assisted manner.

17. The combine harvester as claimed in claim 1, wherein the process supervisor is configured for detecting and evaluating an indirect or direct interaction taking place between the driver assistance system and the operator.

18. The combine harvester as claimed in claim 1, wherein the process supervisor is configured for automatically entering into an interaction with the operator due to plausibility checks and/or due to an analysis of an overall control of the machine.

19. The combine harvester as claimed in claim 1, wherein the process supervisor is configured for controlling the graphical user interface in the case of a modification of a strategic objective of a harvesting process or a sub-strategy carried out by the operator, in order to visualize resultant modifications of adjustment limits of at least one process quality parameter.

20. The combine harvester as claimed in claim 19, wherein the graphical user interface is configured for visualizing the adjustment limits on the basis of absolute values of the at least one process quality parameter.

21. The combine harvester as claimed in claim 20, wherein the graphical user interface is configured for visualizing a trend of the at least one process quality parameter.

22. The combine harvester as claimed in claim 21, wherein the graphical user interface is configured for additionally displaying a current actual value of the at least one process quality parameter.

* * * * *